United States Patent
Morrison (10) Patent No.: US 6,484,312 B1
(45) Date of Patent: Nov. 19, 2002

(54) INFERRING OPERAND TYPES WITHIN AN INTERMEDIATE LANGUAGE

(75) Inventor: Vance P. Morrison, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/326,863

(22) Filed: Jun. 7, 1999

(51) Int. Cl.7 .................................................. G06F 9/45
(52) U.S. Cl. ....................................................... 717/146
(58) Field of Search ............................... 717/7, 5, 6, 8, 717/9, 146, 136, 149, 143, 151, 137–148; 712/220, 230

(56) References Cited

U.S. PATENT DOCUMENTS

| | | | | |
|---|---|---|---|---|
| 5,842,017 A | * | 11/1998 | Hookway et al. | 717/158 |
| 5,930,509 A | * | 7/1999 | Yates et al. | 717/159 |
| 6,021,275 A | * | 2/2000 | Horwat | 717/159 |
| 6,317,872 B1 | * | 11/2001 | Gee et al. | 717/152 |

FOREIGN PATENT DOCUMENTS

| | | |
|---|---|---|
| EP | 0 626 641 A2 | 11/1994 |

OTHER PUBLICATIONS

"Encyclopedia of Computer Science", Third Edition, IEEE Press, Copyright 1993 by Van Nostrand Reinhold, pp. 728–729.

"The Computer Glossary, The Complete Illustrated Dictionary", Seventh Edition by Alan Freedman, copyright 1995, pp. 201 and 319.

von H. Schauer, Architektur und Implementierung eines PASCAL–Systems fur Mikrocomputer, vol. 24 (19982), Jun., No. 3, Munich, Germany.

Ganapathi et al, Retargetable Compiler Code Generation, Computing Surveys, vol. 14, No. 4, Dec. 1982.

Cordy, Holt, Code Generation Using an Orthogonal Model, Software Practice & Experience, 20(1990) Mar., No. 3.

Shields, Sheard, Jones, Dynamic Typing as Staged Typed Interface, POPL '98. Proceedings of the 25th ACM SIGPLAN–SIGACT symposium on Principles of programming languages, pp. 289–302. 1998.

\* cited by examiner

*Primary Examiner*—Gregory Morse
*Assistant Examiner*—Hoang-Vu Antony Nguyen-Ba
(74) *Attorney, Agent, or Firm*—Banner & Witcoff, Ltd.

(57) ABSTRACT

Inferring operand types within an intermediate language is disclosed. In one embodiment, a computer-implemented method first inputs an intermediate language code that has a first plurality of opcodes, including a type-indefinite opcode. The method resolves the type-indefinite opcode into a typed opcode, and generates a native code that has a second plurality of opcodes corresponding to the first plurality of opcodes, and which includes an opcode corresponding to the typed opcode. The method finally outputs the native code. An example of an intermediate language is Java.

40 Claims, 5 Drawing Sheets

INFERRING OPERAND TYPES WITHIN AN INTERMEDIATE LANGUAGE

FIELD OF THE INVENTION

This invention relates generally to intermediate languages, and more particularly to inferring operand types within such intermediate languages.

BACKGROUND OF THE INVENTION

Intermediate language-type models for programming languages have become increasingly popular. In an intermediate language model, a source code is generally compiled into a desirably substantially platform-independent intermediate language. When the code is desired to be run on a particular platform, an execution engine on that platform then interprets or compiles the intermediate language to native code understandable by the platform. Examples of systems that use intermediate languages include the Java virtual machine.

As an example of native code, it is noted that processors such as x86-type processors known in the art generally require a separate instruction for an operation as the operation is applied to each different data type. For example, an "add" operation will usually have a separate "add integer" instruction for integer data types, and an "add real" instruction for real (i.e., floating point) data types. Other data types for which separate instructions may be required include "short" integers, "long" integers, etc.

Execution speed and code size are important considerations in the usability of code written in any programming language in general, and in an intermediate language in particular. These two metrics in general are at odds with one another. For example, because intermediate language code generally is compiled to native code as it is being executed, its execution speed is usually slower than comparable programs already pre-compiled into native code. On the other hand, intermediate language code is also more likely to be stored in small consumer electronics device and more likely meant for transmission over the Internet as compared with more traditional computer programs, rendering code size a more important metric in the intermediate language code's usability than compared with more native computer programs, which are usually stored, for example, on voluminous CD-ROM's and hard disk drives.

Like most computer languages, intermediate languages have instruction sets, with each instruction having a corresponding "opcode" that identifies the instruction. For expressiveness and ease of programming, a large number of instructions, and therefore corresponding opcodes, is desirable. However, having more than 256 instructions or opcodes means that more than one byte is necessary to identify each instruction. If more than 256 instructions are desired, then another byte must be added to uniquely identify each opcode.

Having more than 256 instructions, however, while allowing for a richer instruction set, is disadvantageous when execution speed and code size are considered. Having each instruction take up two bytes instead of one byte increases the size of the resulting code. Furthermore, the extra size implies more memory accesses (page faults) and thus generally takes longer than processing instructions that are shorter in length. There is a need, therefore, for a robust instruction set that nevertheless provides for the execution speed and code size advantages that one-byte opcodes provide. For these and other reasons, there is a need for the present invention.

SUMMARY OF THE INVENTION

The invention relates to inferring operand types within an intermediate language. In one embodiment, a computer-implemented method first inputs an intermediate language code that includes type-indefinite opcodes. The method transforms the input code into a second stream of opcodes, where the types of each type-indefinite opcode has been inferred contextually. The method finally generates native code from the type opcode stream.

In one embodiment, for example, a program already in intermediate language code may have an "add" instruction, to add two numbers like 4 and 5, or 4.5 and 5.5. In the former case, both of these numbers are integers, while in the latter case, both are real numbers. Therefore, one embodiment of the invention would note that in the first case the add instruction is adding two integers, and would resolve that instruction to a specific "add integer" instruction—while in the latter case, the embodiment would note that the add instruction is adding two real numbers, and would resolve the instruction to a specific "add real" instruction, which is a different instruction than the "add integer" instruction. When generating native code, which is the specific code that is executed by a computer's processor, for example, the method would thus generate a corresponding "add integer" native opcode for the typed "add integer" instruction, and a corresponding "add real" native opcode for the typed "add real" instruction.

The invention provides for advantages not found in the prior art. For example, the invention allows for a robust instruction set that still has a relatively small total number of opcodes. For example, rather than having an "add" instruction for each type of operand—e.g., an "add floating point (real)" instruction, an "add short (integer)" instruction, an "add long (integer)" instruction, an "add integer" instruction, etc.—an embodiment of the invention instead only needs a single "add" instruction, since the specific type of this instruction is later resolved by the invention. An instruction set can therefore still be robust, while nevertheless using only a single byte to identify each opcode—thus ensuring the speed and size advantages that result from using a single byte.

The invention includes computer-implemented methods, machine-readable media, computerized systems, devices and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
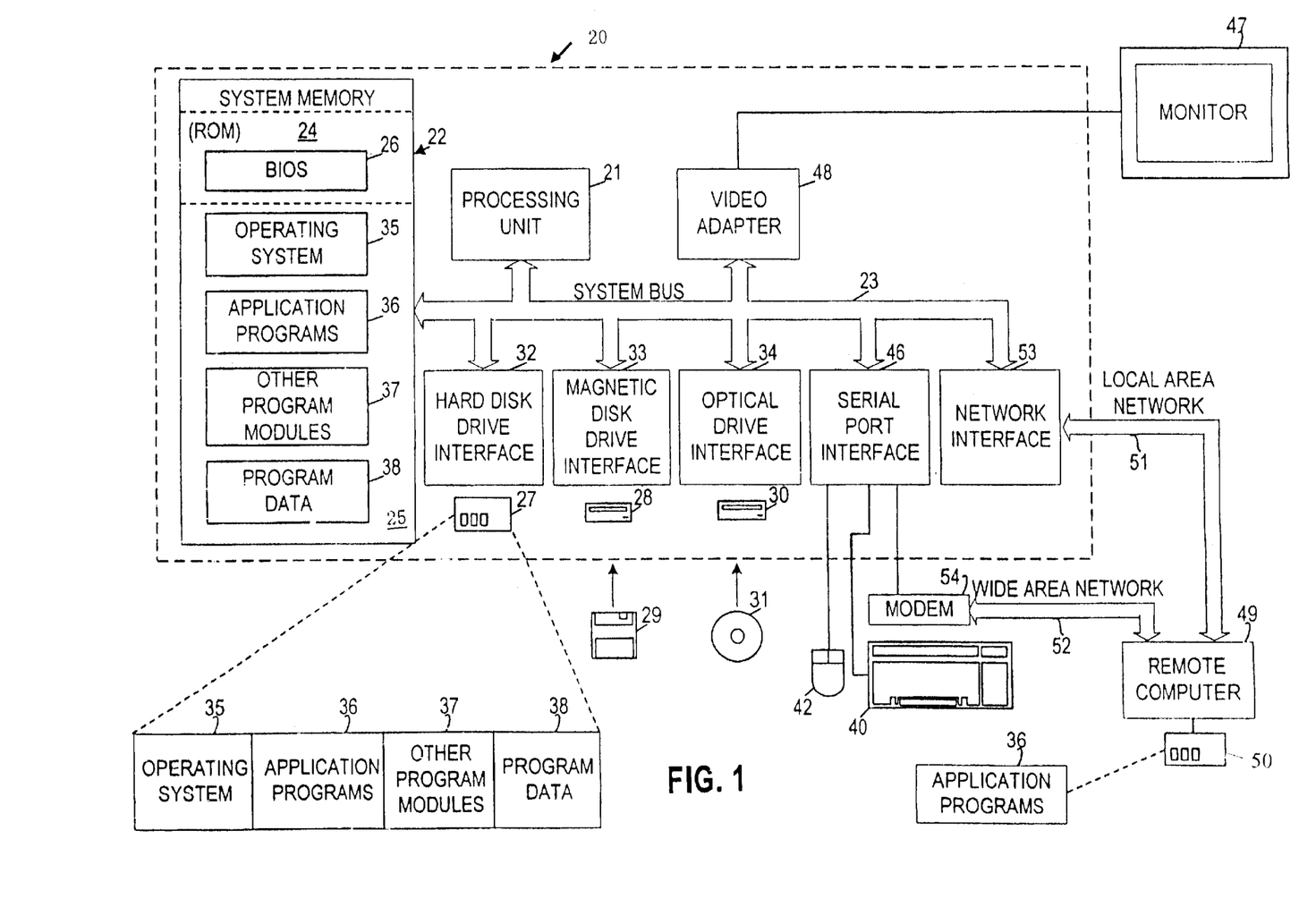
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Intermediate Language Environment

Figure 2:
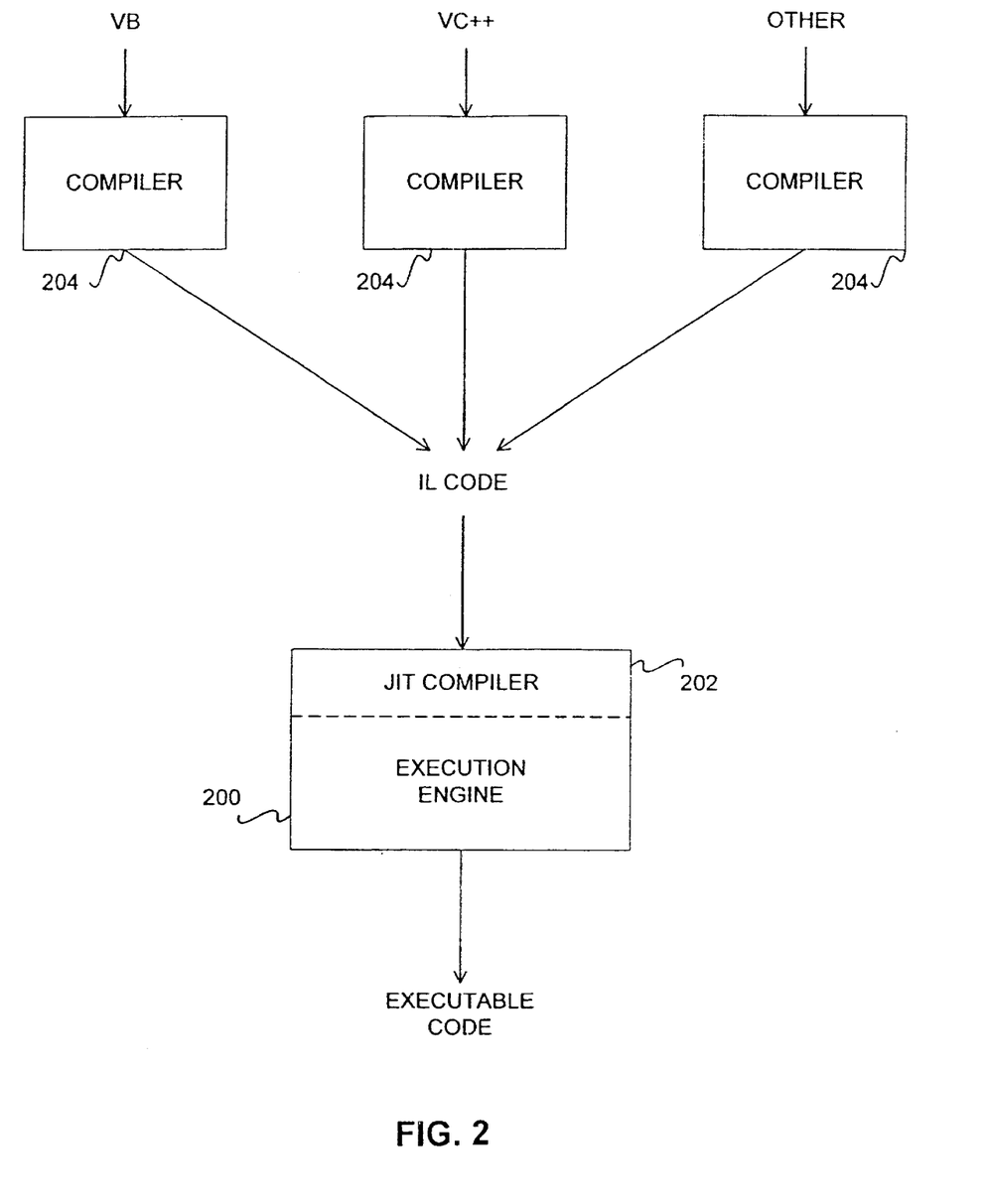
FIG. 2 is a diagram of an intermediate language environment according to an embodiment of the invention, of which a part thereof can be implemented within a system or a device, according to an embodiment of the invention.

In this section, description is provided of an overview of an intermediate language environment, according to one embodiment of the invention. Referring to FIG. 2, a diagram of an intermediate language environment according to an embodiment of the invention is shown. The environment of FIG. 2 includes an execution engine 200, of which a just-in-time (JIT) compiler 202 is a part. Multiple source code language sources, such as Visual Basic (VB), Visual C++ (VC++), and other sources, are compiled, by compilers such as compilers 204, into intermediate language (IL) code. The execution engine 200 then compiles, interprets, or just-in-time compiles, via a mechanism such as a compiler, interpreter, or just-in-time compiler, (the latter which is the case specifically shown in FIG. 2, as a result of the inclusion of the JIT compiler 202 in the engine 200) the IL code into executable code (based on the intermediate code) native to a particular platform. This executable code is also referred to as native code. That is, the execution engine 200 translates the intermediate code to the executable code for execution. Furthermore, in one embodiment, the execution engine 200 includes a mechanism to resolve a type-indefinite opcode of an IL code into a typed opcode, as described in further sections of the detailed description. The mechanism in one embodiment is part of the compiler 202.

Each of the compilers 204, the execution engine 200, and the constituent parts of the execution engine (such as the compiler 202) can in one embodiment be a computer program executed by a processor from a computer-readable medium such as a memory. Compilers such as compilers 204 are known within the art. Each of the multiple source code language source, the IL code, and the executable code can in one embodiment be stored as data on a computer-readable medium, such as a memory or a hard disk drive. The invention is not so limited, however.

In one embodiment, the execution engine 200 is part of a system that does not include the compilers 204, such that the compilers 204 pre-compile the source code into IL code, which is then stored on a computer-readable medium within the system. In another embodiment, the execution engine and its constituent parts are part of a device, such as the computer described in the preceding section of the detailed description. Other devices amenable to the invention include: a set-top box for a television, a hand-held device, a television set, a consumer electronics device, a laptop computer, a hand-held computer, an appliance, a desktop computer, and an automotive electronics device. The invention is not so limited. Such devices typically include a processor and a machine-readable medium such as a memory, such that the execution engine 200 and its constituent parts are executed by the processor from the medium.

Overview

In this section of the detailed description, an overview of how at least some embodiments of the invention work is described. This description provides a foundation for understanding methods and systems of different embodiments of the invention that are presented in the following sections of the detailed description. The overview is described with reference to FIGS. 3 and 4.

As background, the phrase "type state" is first described. The current type state refers generally, in one embodiment, to one or more of: the type state of an opcode stack as it currently exists for a method (as the term method is known within the art), the type state of the arguments for the method (as such arguments are known within the art), and the type state of the local variables for the method (as such local variables are known within the art). It is noted that the latter two type states are fixed for the lifetime of an instantiation of the method.

Conversely, the type state of the opcode stack continually changes as an instantiation of the method runs. For example, starting with a clean (empty) stack, if two integers are "pushed" onto the stack, then the type state of this stack is such that the first two slots of the stack are of type integer. The values of the integers, however, are not important to the current type state—only the types of the data themselves are important for embodiments of the invention. The type state of the stack thus is ever-changing, inasmuch as values are constantly "pushed" onto the stack and "popped" off the stack, as known within the art. As described below, the current type state is used to implement at least some embodiments of the invention.

In one embodiment, the current type state is determined as follows. Because the type state of the arguments for a method and the type state of the local variables for the method are fixed, these type states can be determined by reference to a corresponding array. For example, there may be an argument array such that looking up a specific argument provides its type, and there may be a local variable array such that looking up a specific local variable provides its type. Furthermore, determining the type state of the stack is accomplished by reviewing the stack itself, or by consulting a function of the type state of the stack as a function of the instruction pointer (as the term instruction pointed is known within the art), as is described later in the detailed description. However, it is noted, and as can be appreciated by those of ordinary skill within the art, that the invention is not particularly limited to a specific manner to determine current type state.

Figure 3:
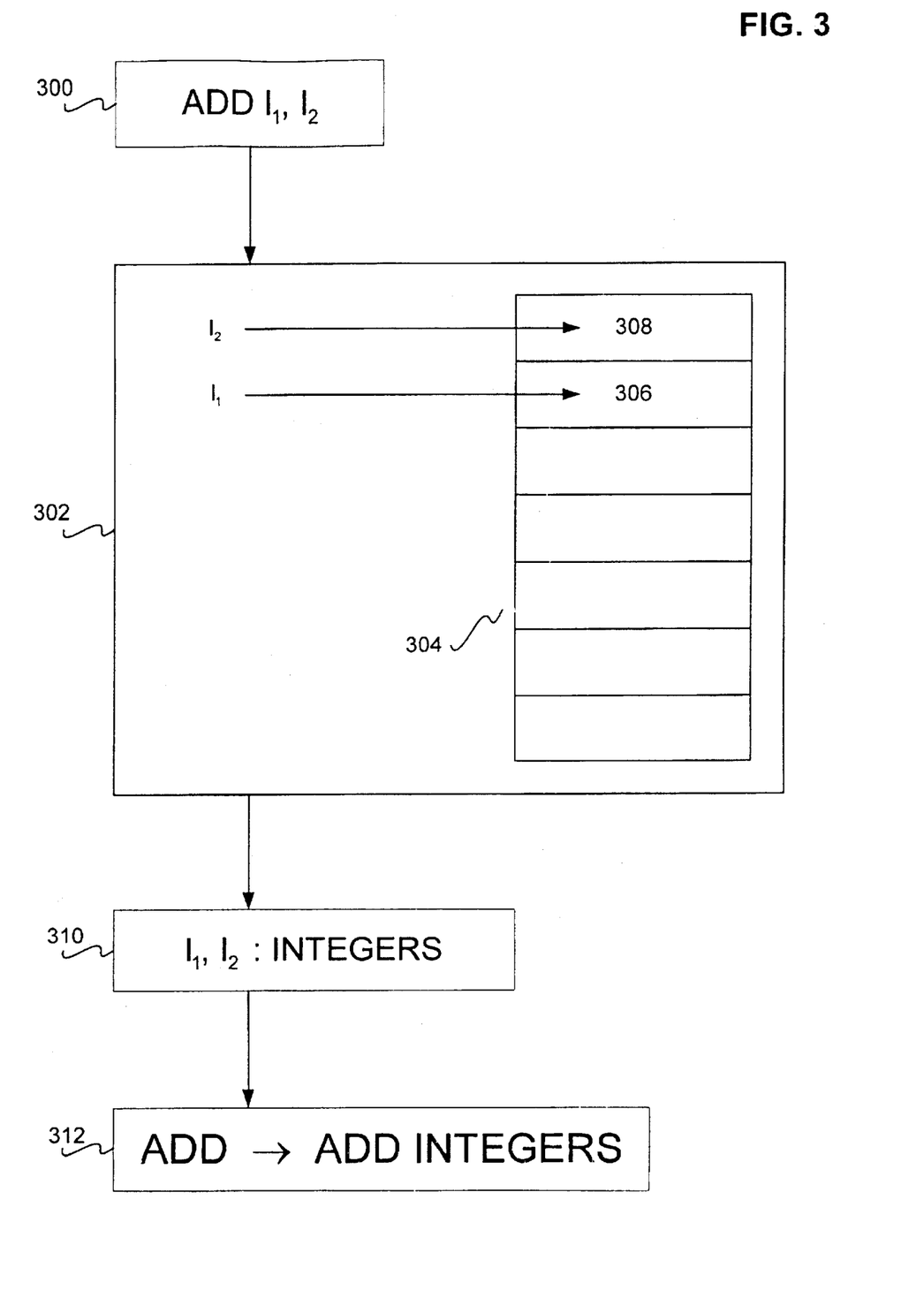
FIG. 3 is a diagram illustrating the operation of one embodiment of the invention.

Referring first to FIG. 3, a diagram illustrating the operation of one embodiment of the invention is shown. In 300, an opcode for an instruction within an intermediate language code is encountered. Specifically the opcode for the type-indefinite instruction ADD is encountered. The instruction ADD is type indefinite in that it does not specify the type of the operands on which it will operate. That is, it is not an op code that is directed specifically to a particular type of operand such as ADD_R8, ADD_I4 (i.e., short integer of four-byte length), ADD_I8 (i.e., long integer of eight-byte length), ADD_INTEGER (i.e, integers which have their size determined by the target computer), etc. By comparison, instructions such as ADD_R8, ADD_I4, ADD_I8, ADD_INTEGER are typed instructions, because they specify the particular type of operands required (e.g. floating point, short integer, long integer, integer, etc.).

The operands for the ADD instruction in 300 are I1 and I2, which are shorthand for a first integer and a second integer, respectively. In 302, these operands are pushed onto a stack 304. I1 is pushed on first, and therefore ultimately resides in the second slot 306 of the stack 304, while I2 is pushed on last, and therefore resides at the top-most slot 308 of the stack 304. Thus, when the ADD instruction is to be compiled or interpreted into native code—that is, when a corresponding native opcode is to be generated for the intermediate language opcode for the ADD instruction—the current type state is such that the stack 304 has integers in each of slots 306 and 308.

In 310, the type of the operands that will be operated on by the ADD instruction are inferred. This is done in one embodiment by indirectly inferring the type of the operands on the stack 304—that is, the type of the operands in slots 306 and 308—such as by examining the current type state when the ADD instruction is encountered for compilation to native code and, possibly, execution. That is, in one embodiment, the stack itself is not directly inspected, but rather the operands thereon are inferred indirectly by knowledge of a type state when the particular ADD instruction is encountered.

In 312, the type-indefinite ADD instruction is resolved into a typed ADDI (add integers) instruction, based on the inference made in 310. That is, the instruction is typed based on the type of the operands on which it is to operate as inferred in 310. Because the operands on the stack 304 are themselves integers, this means that the type-indefinite ADD instruction is specifically meant to add integers, and therefore it is resolved into a typed ADDI instruction. The resolution of type-indefinite instructions to typed instructions is also referred to as disambiguation, since an ambiguous instruction is disambiguated into a non-ambiguous instruction. Not shown in FIG. 3 is that a typed native opcode is then generated, corresponding to the typed IL opcode.

As noted in this description made with reference to FIG. 3, an important aspect to resolving type-indefinite instructions to typed instructions, in one embodiment of the invention, is the inference of the operands on the stack when a particular type-indefinite instruction is to be compiled into native code. As alluded to in the description of 310, this does not necessarily require direct inspection of the stack; rather, the current type state of the stack can be inferred indirectly. This indirect inference of the type state of the operands on the stack so that a typed-indefinite instruction can be resolved to a typed instruction is now described in more detail.

Figure 4:
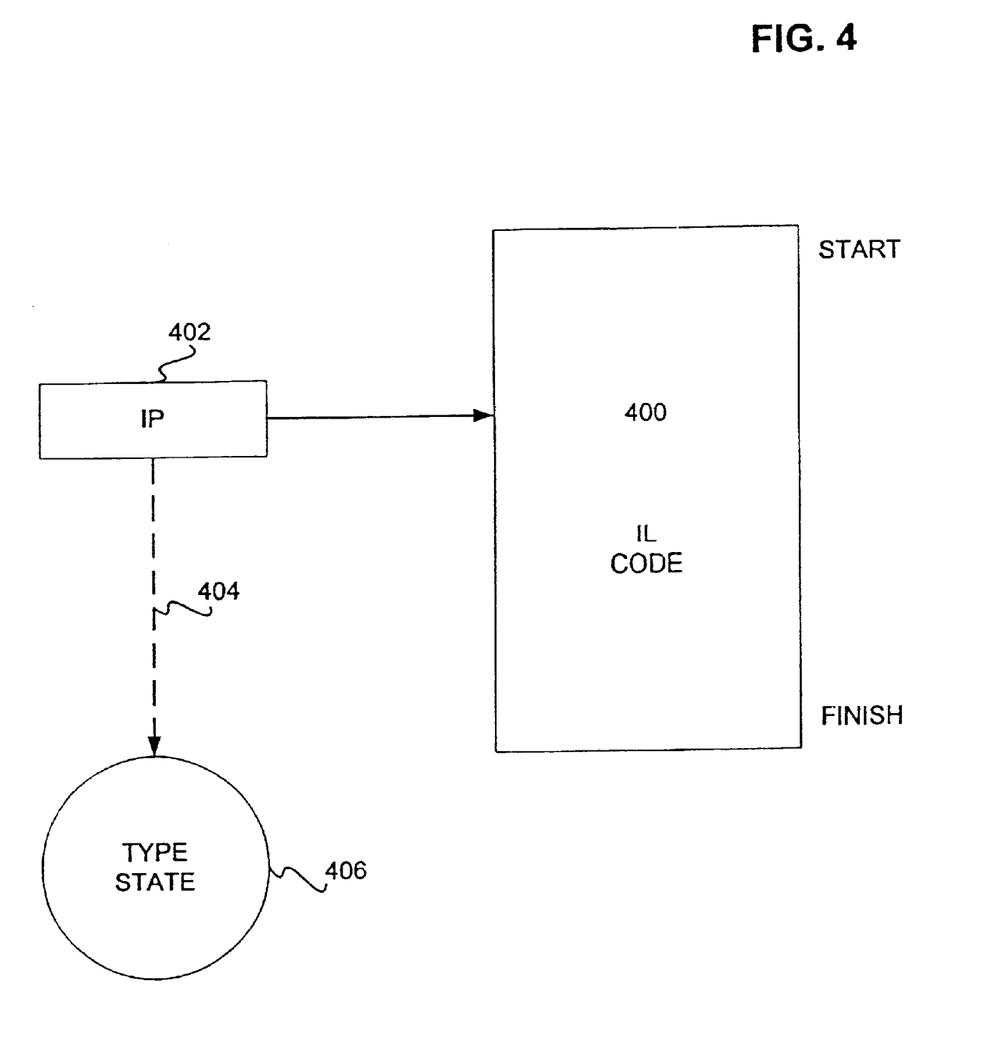
FIG. 4 is a diagram illustrating how a current type state is a function of an instruction pointer, according to one embodiment of the invention; and, FIG. 5 is a flowchart according to an embodiment of the invention.

Referring to FIG. 4, a diagram illustrating how the current type state is a function of an instruction pointer, according to one embodiment of the invention, is shown. The IL code 400 is the code to be just-in-time compiled into native (viz., executable) code, which can then be executed. The current instruction within the IL code 400 being considered for compilation is pointed to by an instruction pointer (or, IP) 402. Thus, the instruction pointer 402 is able to reference any instruction within the IL code 400, from start to finish.

For indirect inference of the type state of the operands on the stack, which is part of the current type state as has been described, an invariant regarding the IL code 400 must hold true in one embodiment of the invention. This invariant is that the type state of the system is independent of the path taken through the IL code 400. That is, regardless of the order in which the instructions within the IL code 400 are processed, the type state of the operands on the stack at any given instruction always remains the same. When a particular instruction is encountered, in other words, it will always be operative on operands of the same type.

This invariant is rephrased as stating that the type state of the system is a function of the instruction pointer 402. Whenever the instruction pointer 402 points to a particular instruction within the IL code 400, the type state of the system is always the same. This is represented in FIG. 4 as a dotted line 404 to a circle 406 representing the type state of the operands on the stack for the IP 402 pointing to a given instruction within the IL code 400.

Thus, in one embodiment, as intermediate language instructions are consumed, a stack of types is continually updated. In other words, the type state of the system, while a function of the IP pointer, such that it is fixed for each instruction pointed to be the IP pointer, in this embodiment of the invention is discerned through the use of a stack, as has been described in the overview, which is every changing as the IP pointer points to different instructions within the IL code. When a type-indefinite instruction such as ADD is encountered, the information needed to resolve the instruction into a typed instruction is readily available on the type stack—and thus the stack does not have to be directly examined. In other words, the maintenance of a type stack provides for inferring the type of the operands for a particular type-indefinite instruction in an indirect manner. It is noted that the type state can be used to determine the next type state, as well.

It is noted also that a necessary corollary of the invariant that the type state of the system is path independent, in one embodiment of the invention, is that for every instruction, the type of any values placed on the stack is a property of the instruction alone—and cannot be a function of the values on the stack. For example, a PUSH_VARIANT instruction that pushes a result on the stack that has a value based upon the value of an operand on the stack is illegal. If this were not true, then path independence would also not be true—depending on initial data acted upon by the IL code, for example, the type state of the system at any particular instruction might be different.

Finally, another invariant, which is optional, that can be utilized in an embodiment of the invention is that a lexical path through the IL code, from top to bottom, is also legal from the standpoint that the type state of the system still remains a function of the IP for this lexical path. This path is as opposed to following each branch encountered in execution. This invariant is useful because it allows the code to be compiled or run in one pass, where the IL is processed. In such an instance, it is important the lexical path through the IL code is legal, so that the types of type-indefinite instructions are properly resolved. It is noted that after an unconditional branch, the stack is assumed to be empty, unless it is a target of a branch which has already been seen.

Methods

In this section of the detailed description, computer-implemented methods according to varying embodiments of the invention are described. The computer-implemented methods can be realized at least in part as one or more programs running on a computer (such as the computer of FIG. 1)—that is, as a program executed from a computer-readable medium such as a memory by a processor of a computer. The programs are desirably storable on a machine-readable medium such as a floppy disk or a CD-ROM, for distribution and installation and execution on another computer.

Figure 5:
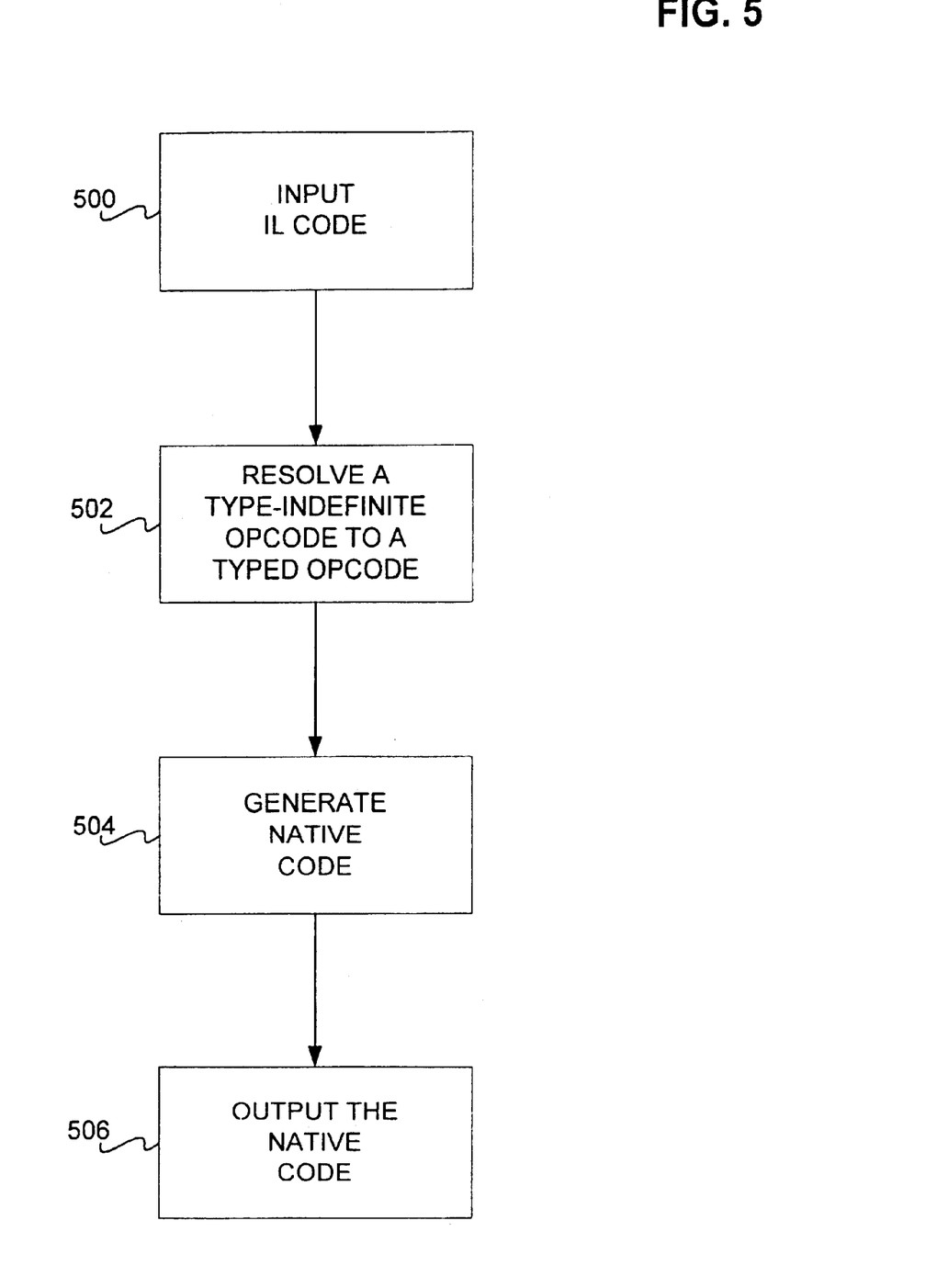

Referring to FIG. 5, a computer-implemented method according to an embodiment of the invention is shown. In 500, an IL code is input. The IL code has a type-indefinite opcode, that corresponds to a type-indefinite instruction, such as ADD, as has been described. The manner by which the IL code is input is not limited by the invention. For example, the IL code can be received from over the Internet, or read from a computer-readable medium, such as a hard disk drive or a non-volatile memory.

In one embodiment of the invention, the IL code is written for a system that has an invariant dictating that a current type state of the system is path independent, as has been described. Another invariant dictating that a lexical path through the code from top to bottom is legal may also apply to the system. The invention is not necessarily so limited, however.

It is also assumed in the method of FIG. 5 that the IL code is then processed as known in the art until the type-indefinite opcode of the IL code is encountered. In such instance, 502 is then performed. For example, just prior to performance of 502, an instruction pointer, as has been described, points to or references the type-indefinite opcode.

In 502, the type-indefinite opcode is resolved into a typed code. This can be accomplished in accordance with the description in the previous section of the detailed description. For example, in one embodiment, this resolution is accomplished by first inferring the type of one or more operands that are referenced by the type-indefinite opcode, and then resolving the type-indefinite opcode into a typed opcode that has a type based on the type of the operands. That is, a current type state, as has been described, can be referenced as a function of the IP referencing the type-indefinite opcode. Or, the type of the operands as the operands lie on an stack can be referenced indirectly in a different manner.

In 504, native (or, executable) code is generated from the IL code, for execution on a particular platform. The native code includes an opcode corresponding to the typed opcode that in 502 was resolved from the type-indefinite opcode of the IL code. In one embodiment, an installation-time compiler, a just-in-time compiler or an interpreter performs both 502 and 504, although the invention is not so limited.

Finally, in 506, the native code is output. The invention is not limited by the manner in which the native code is output. In one embodiment, the native code is output by storing the native code on a computer-readable medium, such as a memory or a hard drive. In another embodiment, execution of the native code constitutes output thereof.

As those of ordinary skill within the art can appreciate, at least one part of the method of FIG. 5 can be executed by a component of the intermediate language environment as described in conjunction with FIG. 2. For example, within a system, a mechanism such as a just-in-time compiler may translate the intermediate-language code to native code, including resolving a type-indefinite opcode into a typed opcode. As another example, within a device, a mechanism may be executed by a processor from a computer-readable medium to resolve a type-indefinite opcode into a typed opcode—in one embodiment by inferring the type of the operands referenced by the type-indefinite opcode. The invention is not so limited, however.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
    inputting an intermediate-language code having a first plurality of opcodes including a type-indefinite opcode;
    generating a native code having a second plurality of opcodes corresponding to the first plurality of opcodes and including a typed opcode corresponding to the type-indefinite opcode; and
    outputting the native code.

2. The method of claim 1, further comprising resolving the type-indefinite opcode into the typed opcode.

3. The method of claim 2, wherein resolving the type-indefinite opcode into the typed opcode comprises:
    inferring a type of at least one operand referenced by the type-indefinite opcode; and
    resolving the type-indefinite opcode into the typed opcode having a type based on the type of the at least one operand referenced by the type-indefinite opcode.

4. The method of claim 3, wherein inferring a type of at least one operand referenced by the type-indefinite opcode comprises referencing a current type state as a function of an instruction pointer referencing the type-indefinite opcode.

5. The method of claim 3, wherein inferring a type of at least one operand referenced by the type-indefinite opcode comprises referencing indirectly the type of the at least one operand as the at least one operand lies on a stack.

6. The method of claim 1, wherein inputting an intermediate-language code comprises inputting an intermediate-language code written for a system having an invariant dictating that a current type state of the system is path independent.

7. The method of claim 1, wherein inputting an intermediate-language code comprises inputting an intermediate-language code written for a system having an invariant dictating that a lexical path through the intermediate-language code from top to bottom is legal.

8. The method of claim 2, wherein resolving a type-indefinite opcode and generating a native code comprises resolving the type-indefinite opcode and generating the native code by one of: an installation-time compiler, a just-in-time compiler, and an interpreter.

9. The method of claim 1, wherein inputting an intermediate-language code comprises inputting the intermediate-language code from a computer-readable medium.

10. The method of claim 1, wherein outputting the native code comprises executing the native code.

11. A computer-implemented method comprising:
    inputting an intermediate-language code having a first plurality of opcodes including a type-indefinite opcode;
    referencing a current type state as a function of an instruction pointer referencing the type-indefinite opcode;
    generating a native code having a second plurality of opcodes corresponding to the first plurality of opcodes and including a typed opcode corresponding to the type indefinite opcode and having a type based on the current type state; and outputting the native code.

12. The method of claim 11, wherein inputting an intermediate-language code comprises inputting an intermediate-language code written for a system having a first invariant dictating that a current type state of the system is path independent, and a second invariant dictating that a lexical path through the intermediate-language code from top to bottom is legal.

13. The method of claim 11, wherein generating a native code comprises generating the native code by one of: an installation-time compiler, a just-in-time compiler, and an interpreter.

14. The method of claim 11, wherein inputting an intermediate-language code comprises inputting the intermediate-language code from a computer-readable medium and outputting the native code comprises executing the native code.

15. A computerized system comprising:

a mechanism to translate an intermediate-language code having a first plurality of opcodes and including a type-indefinite opcode into a native code having a second plurality of opcodes corresponding to the first plurality of opcodes and including a typed opcode corresponding to the type-indefinite opcode.

16. The system of claim 15, further comprising an execution engine of which the mechanism is a part.

17. The system of claim 16, wherein the execution engine comprises a computer program executable by a processor from a computer-readable medium.

18. The system of claim 15, wherein at least one of the intermediate-language code and the native code is stored on a computer-readable medium.

19. The system of claim 15, wherein the mechanism comprises a computer program executable by a processor from a computer-readable medium.

20. The system of claim 15, wherein the mechanism comprises one of: an installation-time compiler, a just-in-time compiler, and an interpreter.

21. The system of claim 15, wherein the mechanism is to translate the type-indefinite opcode of the intermediate-language code to the typed opcode of the native code by inferring a type of at least one operand referenced by the type-indefinite opcode.

22. The system of claim 15, wherein the mechanism is to translate the type-indefinite opcode of the intermediate-language code to the typed opcode of the native code by referencing a current type state as a function of an instruction pointer referencing the type-indefinite opcode such that the typed opcode has a type based on the current type state.

23. A device comprising: a processor;

a machine-readable medium; and a mechanism executed by the processor from the machine-readable medium to resolve a type-indefinite opcode of an intermediate-language code into a typed opcode.

24. The device of claim 23, wherein the device is selected from a group essentially consisting of: a set-top box, a hand-held device, a television set, a consumer electronics device, a desktop computer, a laptop computer, a hand-held computer, an appliance, and an automotive electronics device.

25. The device of claim 23, wherein the machine-readable medium comprises a memory.

26. The device of claim 23, wherein the mechanism is to resolve the type-indefinite opcode into the typed opcode by inferring a type of at least one operand referenced by the type-indefinite opcode such that the typed opcode has a type consistent with the type of the at least one operand.

27. The device of claim 23, wherein the mechanism is to resolve the type-indefinite opcode into the typed opcode by referencing a current type state as a function of an instruction pointer referencing the type-indefinite opcode such that the typed opcode has a type based on the current type state.

28. The device of claim 23, further comprising a compiler of which the mechanism is a part.

29. The device of claim 28, wherein the compiler is to generate a native code based on the intermediate-language code.

30. The device of claim 29, further comprising an execution engine to execute the native code.

31. A device comprising:

a compiler to compile an intermediate-language code into a native code;

an execution engine to execute the native code; and a mechanism, to infer a type of at least one operand referenced by a type-indefinite code of the intermediate-language code such that the type-indefinite code is resolvable into a typed opcode.

32. The device of claim 31, further comprising a processor and a computer-readable medium, such that at least one of the compiler, the execution engine and the mechanism is executed by the processor from the computer-readable medium.

33. The device of claim 31, wherein the mechanism is part of the compiler.

34. The device of claim 31, wherein the mechanism is to infer the type of the at least one operand by referencing a current type state as a function of an instruction pointer referencing the type-indefinite opcode such that the typed opcode has a type based on the current type state.

35. The device of claim 31, wherein the mechanism is to infer the type of the at least one operand by referencing indirectly the type of the at least one operand as the at least one operand lies on a stack.

36. A machine-readable medium having instructions stored thereon for execution by a processor to perform a method comprising:

inputting an intermediate-language code having a first plurality of opcodes including a type-indefinite opcode;

resolving the type-indefinite opcode into a typed opcode;

generating a native code having a second plurality of opcodes corresponding to the first plurality of opcodes and including an opcode corresponding to the typed opcode; and outputting the native code.

37. The medium of claim 36, wherein resolving the type-indefinite opcode into a typed opcode comprises:

inferring a type of at least one operand referenced by the type-indefinite opcode; and resolving the type-indefinite opcode into the typed opcode having a type based on the type of the at least one operand referenced by the type-indefinite opcode.

38. The medium of claim 37, wherein inferring a type of at least one operand referenced by the type-indefinite opcode comprises referencing a current type state as a function of an instruction pointer referencing the type-indefinite opcode.

39. A machine-readable medium having instructions stored thereon for execution by a processor to perform a method comprising:
- inputting an intermediate-language code having a first plurality of opcodes including a type-indefinite opcode;
- referencing a current type state as a function of an instruction pointer referencing the type-indefinite opcode;
- generating a native code having a second plurality of opcodes corresponding to the first plurality of opcodes and including a typed opcode corresponding to the type-indefinite opcode and having a type based on the current type state; and
- outputting the native code.

40. The medium of claim 39, wherein inputting an intermediate-language code comprises inputting an intermediate-language code written for a system having a first invariant dictating that a current type state of the system is path independent, and a second invariant dictating that a lexical path through the code from top to bottom is legal.

* * * * *